(No Model.)

G. W. & A. E. IVES.
BRIDLE BIT.

No. 541,279. Patented June 18, 1895.

Witnesses.
J. N. Shumway
Lillian D. Kelsey.

Geo. W. Ives
and Alfred E. Ives,
Inventors
By Attys
Earle Seymour

UNITED STATES PATENT OFFICE.

GEORGE W. IVES AND ALFRED E. IVES, OF HAMDEN, CONNECTICUT.

BRIDLE-BIT.

SPECIFICATION forming part of Letters Patent No. 541,279, dated June 18, 1895.

Application filed May 31, 1894. Serial No. 512,964. (No model.)

*To all whom it may concern:*

Be it known that we, GEORGE W. IVES and ALFRED E. IVES, of Hamden, in the county of New Haven and State of Connecticut, have invented a new Improvement in Bridle-Bits; and we do hereby declare the following, when taken in connection with the accompanying drawings and the letters of reference marked thereon, to be a full, clear, and exact description of the same, and which said drawings constitute part of this specification, and represent, in—

Figure 1:
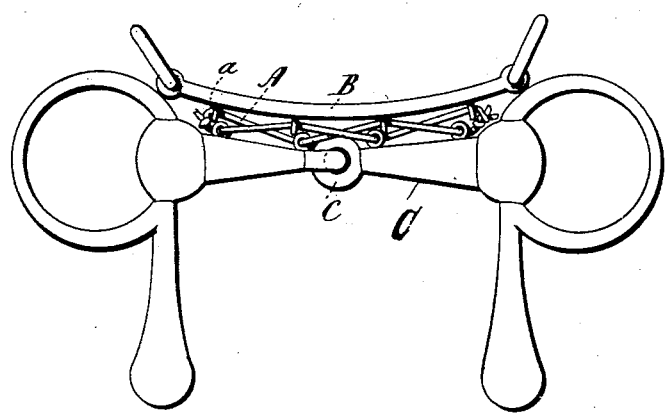
Figure 2:
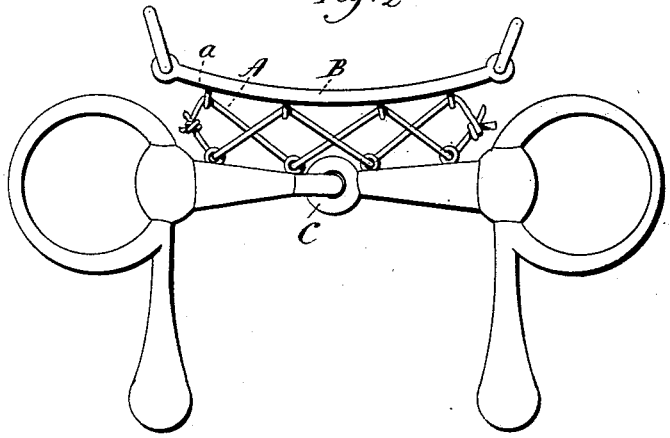

Figure 1, a view in front elevation of one form which a bridle-bit constructed in accordance with our invention may assume; Fig. 2, a similar view showing the separation of the check and line bits by the extension of the cord which connects them together.

Our invention relates to an improvement in bridle-bits of that class in which a check-bit is connected with the rein or line bit, the object being to produce an easy and pliable bit which will not injure the horse's mouth, but which will prevent the animal from lolling, or thrusting his tongue out, and also prevent him from taking the line bit in his teeth.

With these ends in view, our invention consists in the combination with a line bit, of a check-bit, and a cord flexibly connecting the two bits.

Our invention further consists in certain details of construction and combinations of parts as will be hereinafter described and pointed out in the claims.

As herein shown, we have used a laced cord A to flexibly connect the check-bit B with the rein or line bit C, which is of the snaffle type. By preference this cord should be elastic, as we obtain the best results with elastic cord, but we do not limit ourselves to its use, as a non-elastic cord might be employed in its stead. For the attachment of the cord the said bits are provided upon their adjacent faces with a suitable number of eyes *a* which provide for a plurality of independent connections of the cord with the bits. The elastic cord permits the two bits to come close together, as shown in Fig. 1, and also permits them to separate, as shown in Fig. 2.

It will be readily observed by reference to Fig. 2, that the barrier formed by the cord when the bits are separated, effectually prevents the animal from thrusting his tongue out, or lolling. At the same time, the cord cannot possibly injure or irritate the tongue. Furthermore, the cord by its elastic character, tends constantly to pull the line-bit forward in the mouth away from the grinders, whereby the animal will be defeated in his attempt to take the line-bit between them. Moreover, the connection of the two bits as described, prevents the check-bit from coming out of the mouth.

It is obvious that our invention is not limited to the connection of a check-bit, and a line-bit of the snaffle type, but that it is equally well adapted to other forms of line-bits.

The particular adaptation of the two bits for the attachment of the lacing to them, may obviously be varied, as well as the particular mode of applying the lacing, and indeed the cord might be applied in other than an interlaced way, although that mode is preferred. We would therefore have it understood that we do not limit ourselves to the exact construction herein shown but hold ourselves at liberty to make such changes and alterations as fairly fall within the spirit and scope of our invention.

Having fully described our invention, what we claim as new, and desire to secure by Letters Patent, is—

1. In a bridle-bit, the combination with a line-bit adapted to have the lines attached directly to its respective ends, of a check-bit adapted to have the check-line attached directly to its respective ends, and a cord having a plurality of independent connections with the bits between which it is located, and forming a yielding tongue-barrier, substantially as set forth.

2. In a bridle-bit, the combination of a line-bit adapted to have the lines attached directly to its respective ends, of a check-bit adapted to have the check-line attached directly to its respective ends, and a laced cord having a plurality of independent connections with the said bits, between which it is interposed, and forming a yielding tongue barrier, substantially as set forth.

In testimony whereof we have signed this specification in the presence of two subscribing witnesses.

GEORGE W. IVES.
ALFRED E. IVES.

Witnesses:
JULIUS C. CABLE,
E. E. GARRISON.